Dec. 5, 1939.   W. L. KING ET AL   2,182,726
CAKE CUTTER AND SERVER
Filed Aug. 27, 1937
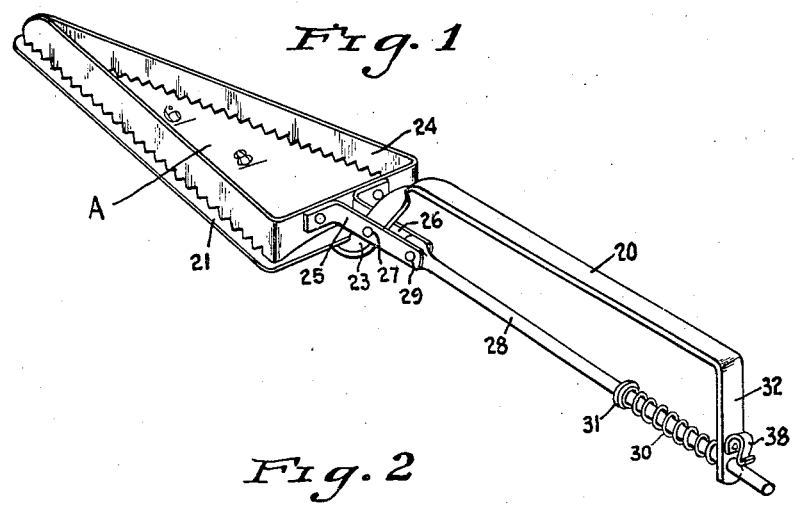
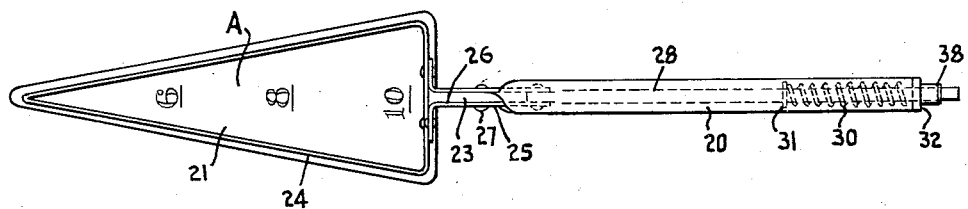
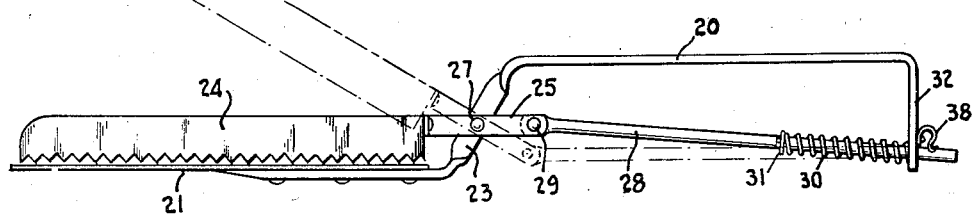
WILLIS L. KING
HERBERT T. HORSCRAFT
INVENTORS
BY *Victor J. Evans & Co.*
ATTORNEYS Patented Dec. 5, 1939

2,182,726

UNITED STATES PATENT OFFICE 2,182,726

CAKE CUTTER AND SERVER

Willis L. King, Rockville Centre, and Herbert T. Horscraft, Oceanside, N. Y.

Application August 27, 1937, Serial No. 161,316

3 Claims. (Cl. 30—114)

This invention relates to improved household equipments and particularly to devices adapted for serving cakes, pies, and the like and to means for cutting same.

It is an object of the present invention to provide a device adapted to cut and serve portions of relatively flat circular food stuffs.

It is a feature of the device according to the present invention that means are provided for cutting segmental portions from food stuffs and for removing same from the uncut portions in a convenient facile manner.

It is another feature of the device according to the present invention that means are provided for cutting portions from circular food stuffs having different diameters.

The invention will be fully and comprehensively understood from a consideration of the following detailed description when read in connection with the accompanying drawing which forms part of the application.

In the drawing:

Fig. 1 is a perspective view of the device according to the present invention.

Fig. 2 is a top plan view; and

Fig. 3 is a side view of the device illustrated in Fig. 1.

In the preferred embodiment of the present invention herein illustrated, the handle member 20 is bent to carry the plate 21, which is fixedly attached thereto and which serves as means for supporting the piece of cake or pastry to be removed. Preferably the plate is formed with an outline corresponding to a segment of a circle, that is a substantially triangular outline. It is preferred that in order to fit the hand as well as to give the device substantial strength, the handle be formed substantially in the manner illustrated, and experience indicates that it is desirable that the means of attaching the plate 21 to the handle 20 be such as will not cause substantial increase in the thickness of the composite structure, that is to say, that it will not cause the bulk underneath the plate 21 to be materially increased.

It is preferred that the upper face of the plate 21 be provided with a plurality of indicia corresponding to pastries having different diameters, for example, in the illustrated embodiment indicia, generally indicated at A, are provided to correspond with pastries having diameters of 6, 8, and 10 units, respectively.

The portion 23 of the handle 20 serves as mounting means for the triangular cutting element 24 supported on the members 25 and 26, which are rotatably associated with the handle portion 23 by means including the pivot 27. The supporting means 25 and 26 can be attached to the cutter element by any suitable means such as welding, riveting, soldering, or the like, although it is preferred for reasons of economical manufacture to attach same by rivets. It will be noted that the ends of the members 25 and 26 are attached to the rod 28 by means including the pivot 29 whereby the rod remains substantially movable relative to said members. The free end of the rod passes thru the opening of the bent portion 32 of the handle 20, being slidable therein, and carries the spring 30 positioned thereon and abutting against the stop 31 mounted on said rod whereby tension in the spring tends to move the rod 28 in the direction of the portion 23 of the handle 20. A spring clip 38 mounted on the portion 32 of the handle 20 is pressed against the rod 28 and engages with cutaway portions thereof whereby the clip tends to hold the rod in positions corresponding to certain preferred positions of the cutter member 24.

It will be noted that the assembly including the cutter 24 is rotatable about the pivot 27 relative to the handle 20 and the plate 21 whereby the cutter can be disposed in substantially the position illustrated in Fig. 1 or can be raised out of position so that it is substantially perpendicular to the base plate. It will be noted that when the cutter is in either of these positions, tension in the spring 30 acting against the stop 31 will tend to maintain the cutter so disposed inasmuch as when the cutter is in the position illustrated in Fig. 1 the pivot 29 is disposed upon a line connecting the pivot 27 and the center of the opening in the portion 32 of the handle 20 wherein the rod 28 slides and accordingly the spring serves to maintain the cutter in downward position. When the cutter is in upward position, it will be noted that the pivot 29 will be below the line connecting the pivot 27 with the center of the opening as aforesaid and accordingly the spring will urge the respective members to maintain their relationship.

In operation, the cutter element 24 is positioned substantially perpendicular relative to the plate 21 and the plate inserted under the pastry to be cut to an extent corresponding to the proper indicia. The rod 28 is then pressed toward the handle 20 whereby the cutter is moved downwardly thereby severing a segmental portion of the pastry from the remainder thereof.

Although in the illustrated embodiment of the present invention the cutter element 24 is provided with teeth, it will be apparent to those skilled in the art that other cutting means can be used such as a knife edge or the like.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A cake server of the type described, comprising a server member; a handle attached to said server; a toggle member comprising a first bar-like element pivoted near the midpoint thereof to a portion of said handle, a second bar-like element pivoted to said first element at an end thereof; and a cutter member mounted on the free end of said first bar-like element, said elements being arranged in a manner whereby displacement of said second bar-like element in one direction from an intermediate dead center position at least tends to move said cutter member into substantial parallelism relative to said server member and displacement of said element in the opposite direction from dead center position at least tends to move said cutter member into a position substantially perpendicular relative to said server member.

2. A cake server of the type described, comprising a server member, a handle attached to said server, a toggle member comprising a first bar-like element pivoted, near the midpoint thereof, to a portion of said handle and a second bar-like element comprising a spring pressed slidably mounted rod pivoted to said first element at an end thereof, and a cutter member mounted on the free end of said first bar element, said elements being arranged in a manner whereby displacement of said second bar-like element in one direction from an intermediate dead-center position at least tends to move said cutter member into substantial parallelism relative to said server member and displacement of said element in the opposite direction from dead-center position at least tends to move said cutter member into a position substantially perpendicular relative to said server member.

3. A device comprising a server; a handle attached thereto; a toggle comprising a first element, pivoted near its midpoint to said handle, and a second element pivoted to said first element at an end thereof; and a cutter mounted on the free end of said first element, said elements being arranged whereby displacement of said second element in one direction from an intermediate dead center position at least tends to move said cutter member into substantial parallelism relative to said server member and displacement of said element in the opposite direction from dead center position at least tends to move said cutter member into another position relative to said server member.

WILLIS L. KING.
HERBERT T. HORSCRAFT.